(12) United States Patent
Clarke, Jr. et al.

(10) Patent No.: US 8,321,704 B2
(45) Date of Patent: *Nov. 27, 2012

(54) MANAGING ELECTRIC POWER CONSUMPTION BY CONFIGURING ELEMENTS OF A DISTRIBUTED COMPUTING SYSTEM

(75) Inventors: Edward P. Clarke, Jr., Ossining, NY (US); Lorraine M. Herger, Port Chester, NY (US); Marcel-Catalin Rosu, Ossining, NY (US); Frank A. Schaffa, Hartsdale, NY (US); Edith H. Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 229 days.

This patent is subject to a terminal disclaimer.

(21) Appl. No.: 12/727,950

(22) Filed: Mar. 19, 2010

(65) Prior Publication Data

US 2010/0174931 A1 Jul. 8, 2010

Related U.S. Application Data

(63) Continuation of application No. 10/426,989, filed on Apr. 30, 2003, now Pat. No. 7,720,968.

(51) Int. Cl.
*G06F 1/32* (2006.01)
*G06F 1/00* (2006.01)
*G06F 15/173* (2006.01)

(52) U.S. Cl. .................. 713/320; 713/300; 709/226
(58) Field of Classification Search ............... 713/320
See application file for complete search history.

(56) References Cited

U.S. PATENT DOCUMENTS

| | | | |
|---|---|---|---|
| 5,598,532 A | 1/1997 | Liron | |
| 6,086,618 A | 7/2000 | Al-Hilali et al. | |
| 6,459,682 B1 | 10/2002 | Ellesson et al. | |
| 6,785,827 B2 * | 8/2004 | Layton et al. | 713/300 |
| 6,877,034 B1 | 4/2005 | Machin et al. | |
| 6,904,449 B1 | 6/2005 | Quinones | |
| 6,938,155 B2 | 8/2005 | D'Sa et al. | |
| 7,058,843 B2 | 6/2006 | Wolf | |
| 7,206,829 B1 | 4/2007 | Buchenrieder et al. | |
| 2002/0133365 A1 | 9/2002 | Grey et al. | |
| 2003/0069984 A1 | 4/2003 | Watanabe | |

OTHER PUBLICATIONS

Fiat, et al., "Online Algorithms: the State of the Art passage", Lecture Notes in Computer Science, Springer Verlag, New York, NY US, vol. 1442, 1998, pp. 178-195, 326-372, XP-002312678. Simmons, "Measurement and the evaluation of I.T. investments", Software Metrics Symposium, 1994, Proceedings of the Second International London, UK Oct. 24-26, 1994, Los Alamitos, CA, USA, IEEE Comput. Soc., Oct. 24, 1994, pp. 74-83.
Verhoosel, et al., "Incorporating Temporal Considerations during Assignment and Pre-run-time Scheduling of Objects and Processes", Journal of Parallel and Distributed Computing, Academic Press, Duluth, MN, US, vol. 36, No. 1, Jul. 10, 1996, pp. 13-31.
Shread, "New Grid Software Takes Aim At RIO, Productivity", Grid Computing Planet, Dec. 19, 2001, pp. 1-2.

* cited by examiner

*Primary Examiner* — Suresh Suryawanshi
(74) *Attorney, Agent, or Firm* — Scully, Scott, Murphy & Presser, P.C.; Anne V. Dougherty, Esq.

(57) ABSTRACT

A method and system for managing electric power consumption by elements of a distributed computing system comprises: determining one or more system metrics that relate to electric power usage as consumed by elements of a configured distributed environment; determining a system value in response to the one or more system metrics, the value determined according to one or more value criteria; and, while in-progress applications are being run in the computing environment, evaluating one or more potential changes in the distributed computing environment and determining an alternate system value based on the changes; and, re-configuring elements of the distributed computing environment dynamically while the computing environment is operating, in accordance with a determined alternate system value. The re-configuring elements step is in accordance with a potential change operative to alter electric power consumption.

13 Claims, 9 Drawing Sheets

FIG. 9

| FIELD | VALUES |
|---|---|
| LOCATION 1 | NEW YORK CITY |
| POWER RATE FIRST SHIFT | xx PER KILOWATT |
| POWER RATE SECOND/THIRD SHIFT | yy PER KILOWATT |
| LABOR RATE FOR OPERATORS FIRST SHIFT | $10/HOUR |
| LABOR RATE FOR OPERATORS SECOND SHIFT | $18/HOUR |
| LABOR RATE FOR OPERATORS THIRD SHIFT | $25/HOUR |
| LOCATIONS 2...N | |
| POWER RATE....LABOR RATE | |
| ... | |
| ON DEMAND STORAGE RATE W/IBM | $X/PETABYTE |
| ON DEMAND BANDWIDTH RATE/TELECOM | $Y/GIGABIT |
| ON DEMAND COMPUTE RATE | $Z/GIGAFLOP |
| CASH ON HAND | $M |
| ACCOUNTS RECEIVABLE CUSTOMER A1 | $M |
| ACCOUNTS RECEIVABLE CUSTOMER A2..AN | $M |
| PENALTIES FOR DOWNTIME CUSTOMER A1 | $K/MINUTE OUTAGE |
| PENALTIES FOR DOWNTIME CUSTOMER A2 | $K/MINUTE OUTAGE |
| PENALTIES FOR TRANSACTION PERFORMACE FAILURES FOR CUSTOMER B | $K/THOUSAND |
| INTEREST RATE FOR CAPITAL BORROWING | x%/YEAR |
| CURRENCY CONVERSION FEE $ TO EUROS | |
| CURRENCY CONVERSION FEE EUROS TO $ | |

MANAGING ELECTRIC POWER CONSUMPTION BY CONFIGURING ELEMENTS OF A DISTRIBUTED COMPUTING SYSTEM

CROSS-REFERENCE TO RELATED APPLICATIONS

The present invention is a continuation application of co-pending U.S. patent application Ser. No. 10/426,989 filed Apr. 30, 2003.

BACKGROUND OF THE INVENTION

1. Field of the Invention

The present invention relates generally to the field of systems for managing distributed computing environments, and more specifically, to a system and method of managing distributed computing resources responsive to expected return of value.

2. Description of the Prior Art

A distributed computing system consists of multiple computers connected by a communication network. A computer device (referred to as a "node"), typically does not share memory with other nodes and communicates solely by message passing. The author P. H. Enslow, Jr., in the work entitled "What is a 'Distributed' Data Processing System?", Computer, Vol. 11, No. 1, January 1978, pp. 13-21, lists the following five properties of a distributed data processing system: 1) multiplicity of general-purpose resource components, both physical and logical, that can be dynamically assigned to specific tasks; 2) physical distribution of the physical and logical resources by means of a communications network; 3) high-level operating system that unifies and integrates the control of the distributed components; 4) system transparency, which allows services to be requested by name only; and, 5) cooperative autonomy, characterizing the operation and interaction of both physical and logical resources.

The availability of low-cost general-purpose computing systems, the advances in networking technologies, the development of resource sharing software (OS and middleware) and the increased user demands for data communication, sharing of computing resources and data have contributed to the widespread use of distributed computing. Today, almost every computer is an element of a larger distributed system.

Popular applications running on distributed platforms include e-mail, ftp, web servers, multimedia toolkits, and electronic transaction systems. In addition, distributed computing systems are the preferred platform for massively parallel computations and fault tolerant systems. Recently, new forms of distributed computing have come into use. For instance, SETI@HOME employs volunteers from the wide world to run computation on their individually owned machines, to make progress on the search for extra-terrestrial intelligence.

Distributed systems typically consist of a collection of heterogeneous hardware and software elements, with some of the nodes dedicated to a specific activity, such as name or file servers. Systems comprising a collection of homogeneous hardware and software elements are typically called clusters and are used for parallel computing.

Grid computing is an emerging approach to distributed computing. With grid, standard resource aggregation, discovery and reservation mechanisms allow information technology ("IT") resources to be employed by a wide variety of users, for a wide variety of tasks (some of which would not have been possible for any given user without it), and further enable the formation of virtual organizations. Most recently this has been the province of academic institutions, or non-profit laboratories. At this time, grid infrastructures are beginning to be used for commercial purposes, for example, life sciences companies seeking deep computing for drug discovery. A number of enterprises and organizations have been involved in establishing these open standards. A description of grid, and pointers to the standards are available at http://www.globus.org/research/papers/anatomy.pdf. The Globus project (http://www.globus.org) is an organization that is developing the fundamental technologies needed to build computational grids.

A Grid is a collection of computers connected by a network and controlled by an overall scheduling process. As in other distributed computing methods, resource management is a particularly important aspect of efficient performance for a grid. In grid computing, a scheduler element is responsible for monitoring various resources on each grid computer and ensuring that nothing is overloaded. Typical resources that are used in determining which grid computer to run a job (or part of a job) on are CPU utilization, memory availability and disk space. The resource management element may also consider suitability of resources for a particular job—for example, the availability of a compiler, the CPU processor type, licenses for software and business policies (such as, for example, a policy that prevents running payroll programs on a public workstation).

A necessary ingredient for all distributed computing is the network that connects the elements. The network is a potential point of failure or performance degradation, and its management is a specialized field. Network management commonly refers to the use of tools, applications and specialized devices to assist personnel in maintaining a network usually composed of heterogeneous elements, such as routers, computers systems, and switches. Network management may permit different administration domains, with each domain separately managed. Goals of network management are: performance management (e.g., maintenance of network performance at acceptable levels); problem management (e.g., determination and bypass or correction of problems); accounting management (e.g. ensuring that billing is in accord with network usage); configuration management (e.g. tracking configuration and its effect on performance). Network management seeks to present information about the status and performance of a network to an operator, and further support goals of minimizing problems with a network, such as congestion, and maximizing performance (e.g., measured throughput, minimized latency), as measured by metrics captured through logging, probes, or inference.

Representative of systems for maximizing network performance include the system described in U.S. Pat. No. 6,459,682 entitled "Architecture for Supporting Service Level Agreements in an IP network" which teaches a method of controlling traffic in an IP network. As described in U.S. Pat. No. 6,459,682, the system includes a means for identifying internode connections and determining traffic classes and flows, transforming packets to encode information about traffic classes, and regulating transmission to meet performance objectives. This and other patents in network management teach how to achieve performance objectives in a network, without reference to external financial measurements.

A recently emerging approach to managing service deliverables on an IT infrastructure is the Service Level Agreement ("SLA"). An SLA is a contract between a customer and a service provider that describes, in detail, the responsibilities of each party to the contract. It usually provides specific measurable terms for the provider of the service, and simple must-provide terms for the customer. An example of such an agreement may be the following: "Provider will supply three hours of dedicated computer time on a server per week. Customer must provide working programs. Provider will not debug customer code." SLAs may be in place between an IT organization and its same-enterprise line of business customers, or may be in place between multiple enterprises. SLOs are service level objectives. SLOs generally show intent to provide service, but lack penalties for non-performance.

In order to conform to SLA agreements, methods of monitoring systems to ensure performance have been developed. U.S. Pat. No. 5,893,905 entitled "Automated SLA Performance Analysis Monitor with Impact Alerts on Downstream Jobs" teaches a system and method for monitoring the performance of selected data processing jobs, comparing actual performance against the Service Level Agreement (SLA) to which each monitored job belongs, identifying discrepancies, and analyzing impacts to other jobs in a job stream. This allows more effective compliance with SLA terms.

It may be necessary within an IT infrastructure to balance resources and priorities among multiple internal or external customers. Policy Management software is intended to integrate business policies with computing resources. Work that is more valuable to the business is given a higher priority than less valuable, and therefore assigned resource on that basis. Firms such as Allot Communications (http://www.allot.com/) offer software that is policy based SLA management with the objective of maximizing application performance and containing costs.

Return on investment ("ROI") is a financial analysis that helps a business to decide whether accept or reject a project. There are alternative, accepted approaches to measuring the return on investment. One approach is based on accounting income. The two most conventional accounting income based measures are return on capital and return on equity. Another approach to measuring return on investment is based on the cash flows (both in and out) generated by the project under evaluation. Cash flows are estimated pre-debt but after-tax and are usually discounted to account for the time value of money. The conventional cash-flow based measures are net present value, internal rate of return, and payback period. All of these measures have standard and well accepted definitions which can be found in any textbook on corporate finance. These models tend to be static, with the information input changing slowly.

Current methods of resource management, both policy and SLA driven, do not consider the effect on corporate value. Network management focuses on service level agreements and methods of managing the network so as to remain in compliance. Such methods do not consider factors such as financial, labor rates, etc. Often, they sub-optimize.

What is needed is a way to improve value rather than increase any given IT metric such as utilization.

Financial models for IT value provide methods for evaluating return on capital investment, evaluating risk, and other traditional measures of fiscal responsibility. These are calculated based on static inputs, formed from actual financials achieved or from projected figures. They do not take into account the ability to employ variable (e.g., on demand) IT capacity, nor the ability to provide variable services. Further, they do not automatically validate the financial models with current measurements.

It would be highly desirable thus to provide a system that includes variable IT capacity and variable IT services to validate the financial models with current IT measurements.

Thus there exists a need for a network management system and methodology for configuring elements of a distributed computing system that takes into account broader ROI, to determine what actions to take.

SUMMARY OF THE INVENTION

It is thus an object of the present invention to provide a method and system for configuring elements of a distributed computing system based on evaluations of their cost impact, as it relates to power usage.

It is an object of the present invention to provide a method and system for configuring elements of a distributed computing system based on evaluations of their cost impact, and particularly, based on an evaluation of predicted Return On Investment ("ROI").

It is thus an object of the present invention to provide a method and system for configuring elements of a distributed computing system such as a grid—e.g., determining which resources should be part of the grid, or which tasks should be added to a run queue, based on an evaluation of predicted ROI.

According to a preferred aspect of the invention, there is provided a system and method for managing electric power consumption by elements of a distributed computing system comprising the steps of:

a) determining one or more system metrics that relate to electric power usage as consumed by at least one element of a configured distributed environment;

b) determining a system value in response to the one or more system metrics, the value determined according to one or more value criteria;

c) while in-progress applications are being run in the computing environment, evaluating one or more potential changes in the distributed computing environment and determining an alternate system value based on the changes; and, d) re-configuring elements of the distributed computing environment dynamically while the computing environment is operating, in accordance with a determined alternate system value.

The re-configuring elements step is in accordance with a potential change operative to alter electric power consumption.

The present invention may be advantageously implemented by the owner of a distributed computing environment such as a corporate grid or, performed as a service provided by a third party.

BRIEF DESCRIPTION OF THE DRAWINGS

Further features, aspects and advantages of the apparatus and methods of the present invention will become better understood with regard to the following description, appended claims, and the accompanying drawing where:

DETAILED DESCRIPTION OF THE PREFERRED EMBODIMENT

The invention is essentially directed to a method and system for configuring elements of a distributed computing system based on evaluations of their value add and cost impact.

Figure 1:
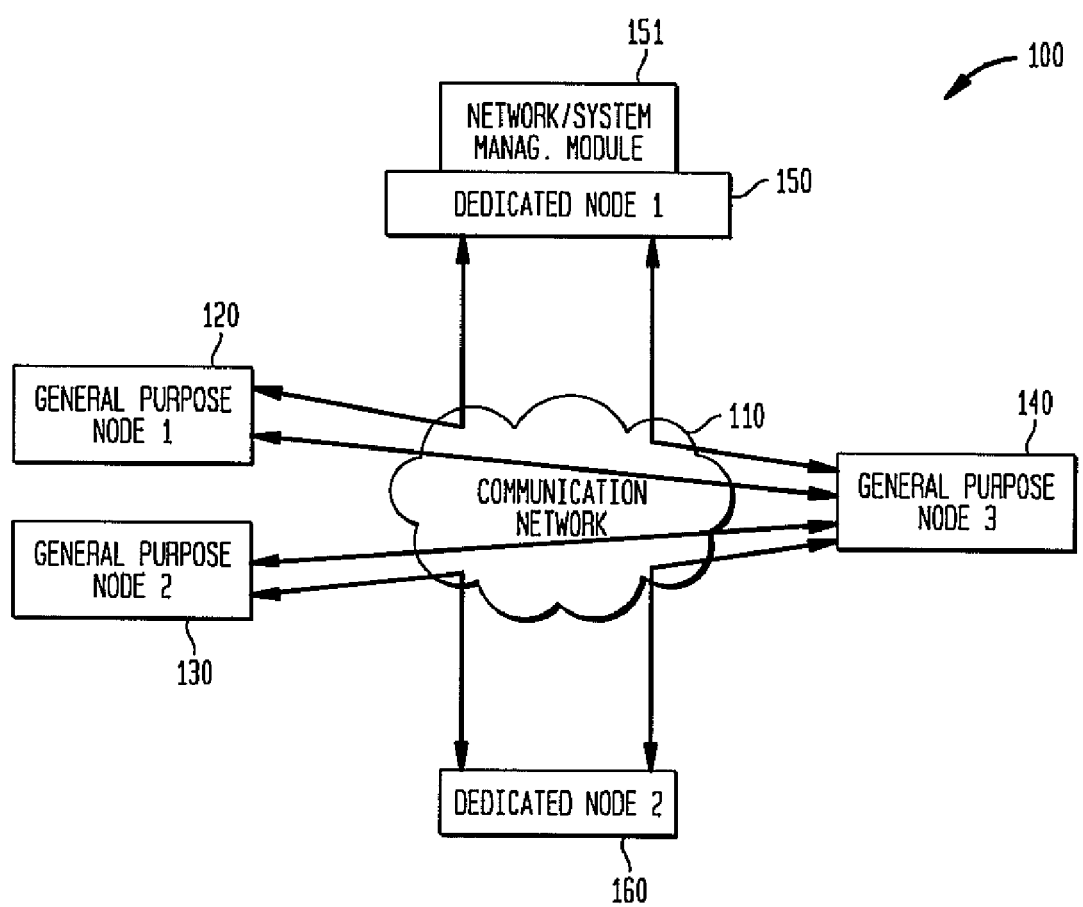
FIG. 1 depicts a distributed computing system including a networked connection of multiple computing systems.

FIG. 1 describes a distributed computing system 100 comprising multiple computing systems (e.g., 120, 130, 140, 150, and 160) connected by the communication network 110. Computing systems 120, 130, and 140 are configured to run arbitrary (local or distributed) applications, as desired by the distributed system's users; such applications may include email and ftp clients, web browsers, engineering design applications and so on. Computer systems 150 and 160 are configured to run a limited collection of applications, effectively being dedicated to these applications, which are selected by the administrator of the distributed system. Such applications include email, file system, ftp, web proxy servers, enterprise payroll and are typically called system applications. Typically, the system administrator controls all the computer accounts on the dedicated computing systems 150 and 160. Users of the distributed system may access the system applications running on the dedicated systems 150 and 160 indirectly, through client applications running on the general-purpose systems 120, 130, and 140. These applications access the resources on the dedicated systems 150 and 160 through distributed communication protocols based on message exchanges across the communication network 110.

Further shown in FIG. 1 is the provision of a network management module 151. This software element, shown operating on dedicated system 150, receives network management information from other elements of the system, and provides control function to make discretionary changes to the network 110. For example, network management module 151 may receive alerts from systems 140 and 160 each indicating difficulty in communicating with system 130. Network management module 151 may conclude that system 130 is out of communication and so inform an operator.

It is understood that the computing systems 120, 130, 140, 150, and 160 do not have to have identical processor or I/O architectures and do not have to be manufactured or run software manufactured by the same vendor. Software components running on these systems, such as operating system and middleware, translate between a previously agreed, system-independent data representation and local data representations therefore enabling communication between the systems with very different characteristics.

Figure 2:
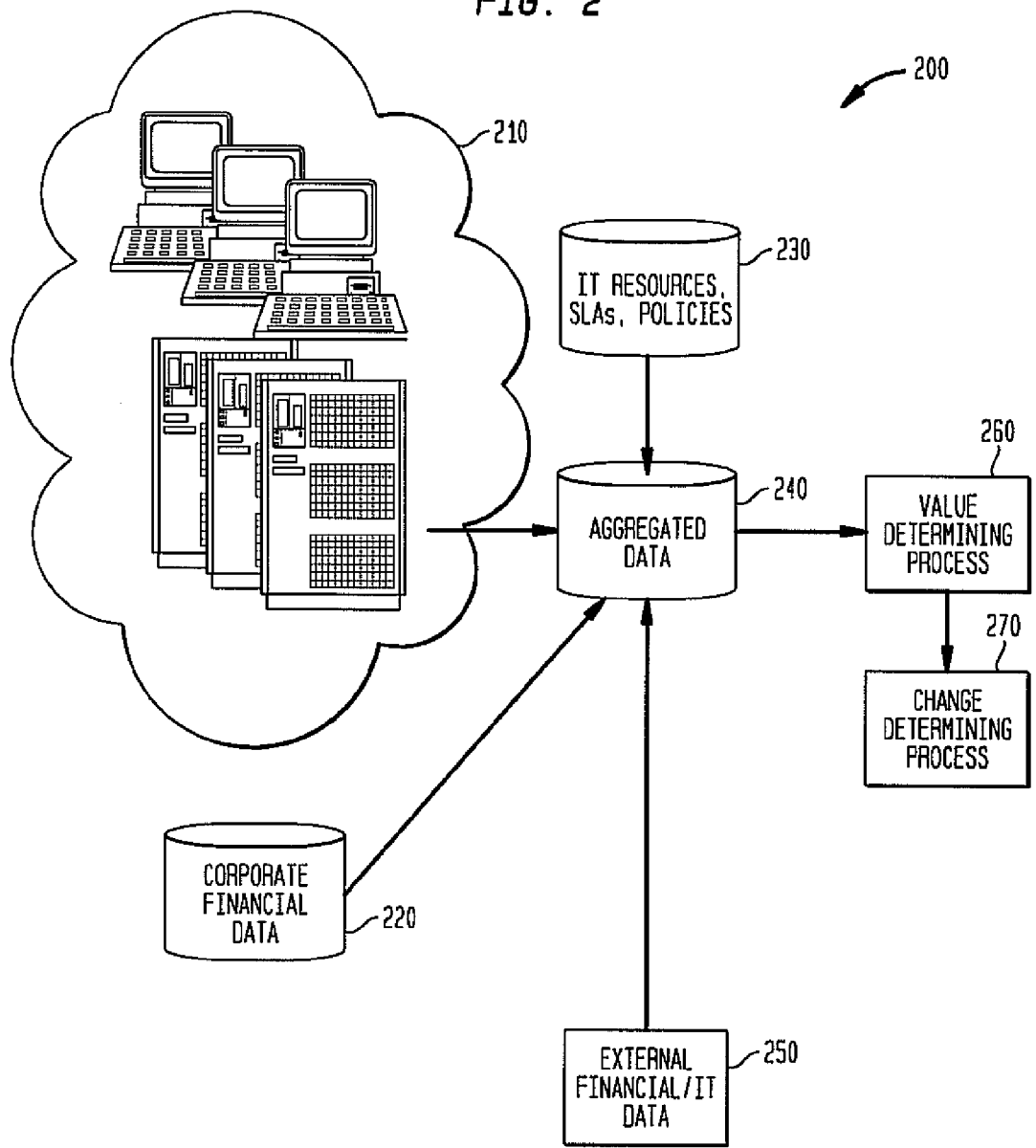
FIG. 2 depicts the flow of information used in the system and method of the present invention.

FIG. 2 depicts the information flow used in the system 200 and method of the present invention. Indicated in the distributed computing environment of the system 200 depicted in FIG. 2 are resources 210 that include both hardware and software elements. Metrics representing information such as attributes of configuration, resources, performance, utilization, hardware and software activity profiles and utilization are determined from these systems and the information is provided to other elements of the inventive system 200.

For example, in FIG. 2, it is shown that the information from resources 210, information from other system elements such as corporate financial data information from resource 220 and IT data from resource 230 and data from external resources 250, are provided to an aggregation point represented by the disk/database element 240. Optionally, one or more of these information flows may be directly provided to a value determining element 260 implementing processes for determining environment value, or may be aggregated with other data in a sub-aggregating element (not shown).

With regard to the types of data that may be aggregated, corporate financial data 220 may include, for example, but is not limited to: costs of labor, real estate, electric power, penalties for SLA non-conformance, tax information, free cash flow, consecutive days of overtime for maintenance personnel, cost of accessing non-corporate distributed computing resources (e.g. buying compute from a publicly available grid) and so on. More specifically, FIG. 9 is a table depicting example elements of corporate financial data that may be used in evaluating environment value. It is understood that many other elements of financial data may be used in evaluating environments. In the table of FIG. 9, fields 705-730 show financial data associated with a single location, in this case as specified in field 705, New York City. Fields 710 and 715 show example power rates at different times of day. In most instances it is advisable to distinguish power rates based on peak load times, or other time differentiators. Fields 720 through 730 illustrate example labor rates for IT operators by shift. Many other labor rates may be useful to evaluate systems, including labor rates for security personnel, systems engineers, managers, and so on. In addition to the fields shown, many other financial details may be used to evaluate environments such as rental rates, impact fees, local tax rates, and so on. Fields 735 through 740 indicate that many other locations may also be represented. Fields 745 through 755 represent example rates for procuring additional IT resource. Field 745 shows the price of example storage when procured in an on-demand model. Similarly, 750 and 755 show example prices for bandwidth and compute cycles. Field 760 shows cash on hand, and 765-770 represent the value of example accounts receivable for various customers. This may be used as part of the prioritization and value statements associated with applications or other jobs that these customers may request or require. Similarly 775 through 785 show example penalties associated with availability, and insufficient performance as measured according to contract. Fields 790 through 798 show example expected currency exchange fees and cost of money. These are examples of financial data, and clearly many other fields are useful.

Referring back to FIG. 2, this information is shown as provided to the aggregation point 240 but may be provided directly to the value determining element 260, a change determining element 270 which implements processes for determining whether a change in the environment is advisable, or aggregated with other data in a sub-aggregating element.

The IT data 230 may include, for example, but is not limited to: data such as additional resource information, historical performance or logs, SLAs, resource management policies, problem determination policies. Further, this IT data may include data representative of IT resources external to the corporate environment, such as data representative of a publicly available grid, as well as data related to the corporate IT environment. The data is provided to the aggregation point 240 but may be provided directly to the value determining element 260, change determining element 270, or may be aggregated with other data in a sub-aggregating element.

The externally provided data, represented as data 250 may be obtained over a network, from a number of sources, including, for example, but not limited to: sources accessible over the world wide web, from a third party service provider, or from a corporate function. The data may include but is not limited to: financial data such as generally available interest rates, contractor labor rates, cost of public compute capacity, price of servers to be bought from a dealer, price of on-demand business services, marketplace information for buyers and sellers of IT resource, etc. Further the data may include, but is not limited to: IT information such as jobs available for servicing, offered prices, and required resource configurations (e.g., jobs requiring resources), available web services and prices, etc. The data is shown as being provided to the aggregation point 240 but may be provided directly to the value determining element 260, change determining element 270, or aggregated with other data in a sub-aggregating element.

As shown in FIG. 2, the aggregating element 240 represents an aggregation point for data originating elsewhere. This aggregation point may comprise a server or data storage facility, either directly attached or attached via the network, and may be part of the corporate environment or provided as a service by a third party. It should be understood that aggregating element 240 may be optionally provided to the system. Further, it is noted that in a preferred embodiment, data from the other elements is obtained without prior request. However, in other embodiments, at least one data element is obtained by request to the data element source.

Further depicted in FIG. 2 is the value determining process depicted as element 260. This element may be co-located with the IT resources of element 210 or, may be located elsewhere. It may be operated by the enterprise or by a consortium, or a third party service provider. The value determining process may use some or all the data provided, may include estimated values, may perform algorithmic calculations, and may request additional data from one of the preceding sources, or from additional external sources. It may be combined with element 270, the change determining process. That is, responsive to the value(s) determined by element 260, is element 270 which implements a change determining process for determining whether a change in the environment is advisable. Change determining may include, but is not limited to: performing optimization algorithms, performing multiple value calculations, negotiating penalties with third parties (e.g., attempting to reduce potential SLA penalties through electronic or non-electronic negotiation communication). Change determining may be real-time, near real-time or non real-time. It may include notification of personnel for review, or personal negotiation with an external or internal partner. Change determining may include processes for determining and specifying the changes to be made, specifying an effective time period during which changes should be in effect, and specifying a process or person to monitor subsequent to the change. Although not shown, it is understood that a process is provided for effecting any change that is determined and this process for effecting a change may be partly, or fully automated.

Implementation of optimization algorithms are well-known in the art. For instance, an Optimization Solutions and Library (OSL), available from the assignee of the present invention, IBM Corp., is a family of products for manipulating and analyzing optimization problems. Individual OSL components implement state-of-the-art algorithms in code that takes special advantage of the characteristics of the platforms on which they run including, but not limited to: IBM mainframes and workstations, PCs, and workstations from other manufacturers. OSL components can be combined into applications as simple as "input, solve, output," or as complicated as a knowledgeable practitioner may create. A link to more detailed information can be found on the OSL Home Page which is located at http://www.research.ibm.com/osl.

Figure 3:
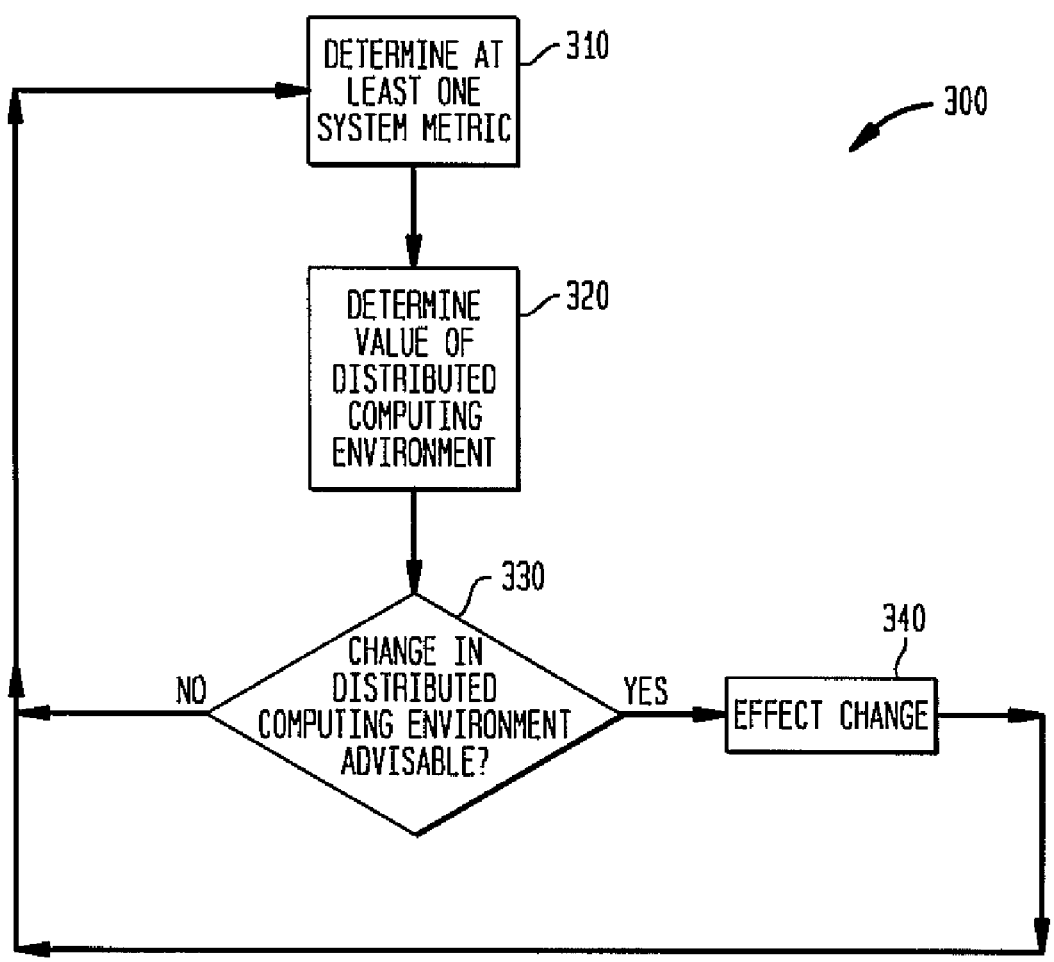
FIG. 3 is a flow chart depicting the methodology of the present invention.

FIG. 3 is a flow chart depicting the methodology 300 of the present invention. The method begins with a step 310 for determining at least one system metric pertaining to one of the systems in the distributed computing environment. In a preferred embodiment, one or more elements of the distributed computing environment are instrumented with hardware or software probes. Hardware probes are mechanisms, often integrated with devices that detect operational errors (e.g., faults) and performance information (data transit times, execution times). These may be built in to the hardware elements (e.g. disk drives, network interfaces, switches) as a standard feature. Software probes, defined analogously, are software components that monitor software metrics such as queue lengths (a collection of jobs, e.g., application executions which the system has been requested to execute), memory usage, processing time, etc. It is understood that these probes may not be part of the application, but may be added after or separately. These probes particularly allow the collection of information such as processor utilization, memory utilization, and communications bandwidth utilization and may provide this information directly to a value determining process, or may provide the information to a system management process. Alternatively, the data may be logged for later processing in near real-time or completely asynchronous post processing.

In one embodiment of the invention, for example, monitoring tools are deployed on potential grid resources to monitor application-level and server-level usage information such as: maximum, and minimum utilization, patterns of application demand, amount of available and required disk, memory, network bandwidth, etc. Tools may be noninvasive, especially for those resources not part of any distributed computing environment, or they may be invasive, e.g., requiring installation of an agent on an IT resource. In one embodiment, the monitoring tools are used to post-process log files.

More specifically, according to the invention, system metrics such Global/Server CPU and memory utilization are very important system metrics. Preferably, the same metrics/per application is obtained for the most demanding applications. Because an enterprise application comprises a collection of processes, and because the system provides resource utilization per process, process trees for the most demanding applications to be monitored are generated. The process tree is typically determined based on its root which is identified by information (e.g., name, executable file on the disk) associated with the application which has been initiated. Additionally important metrics are storage and network I/O activity. For storage I/O activity, paging activity is separated from regular file I/O as excessive paging due to lack of internal memory has dramatic (negative) performance impacts. Furthermore, overloading a server with too many applications will generate excessive paging (superlinear disk activity), while regular file I/O will increase naturally with the number of applications. Typically, monitoring tools separate the two types of disk activity, as paging involves special (paging) disk partitions.

For network I/O activity, data is collected on the performance of network activity (e.g., packets sent/received, bytes sent/received) and data on the 'quality' of the network activity (packets retransmitted, connections reset, opened, packets retransmitted, duplicates ACKs received).

Other activity that may be monitored as potential metrics include: number of processes in the system (all systems have a limit); number of files and connections open; available space in the various file systems for (a) system log(s), and (b) application logs. It is preferred to avoid reaching any of the hard limits of the system, as the operating system may terminate valuable processes or the running processes may fail due to lack of a required resource, such as a file or connection.

Certain metrics, such as application initiations, may be more readily estimated through non-intrusive means. Estimates of system metrics may be obtained through previous performance, previously collected logs, interviews with personnel charged with IT management, and so on. These estimates may be used directly in place of a collected metric or may be used as an initial condition for such a metric, to be refined through other means.

As shown in FIG. 3, the method continues with step 320 wherein a value, such as a Return On Investment value (ROI), is determined for the distributed computing environment. This value may take into account the metrics collected at step 310, as well as cost of hardware, software, network and management, and the value of current in-progress applications and other utilizations. It is understood however, that other factors may also be taken into account. For example, one metric collected in step 310 may relate to network traffic; this may, in turn, affect cost of network to support an application. In a preferred embodiment, this value represents return on investment. The value may be calculated responsive to external financial measurements, such as the current interest rate, real estate costs, and labor rates. Note that the value determination may be provided as a service by a third ($3^{rd}$) party or may be operated by the owner of the distributed computing environment. Other value measures that may be determined for the value of the distributed computing environment in step 320 may include an Internal Rate of Return (IRR), the Net Present Value (NPV) and the Total Cost of Ownership (TCO).

Continuing to step 330 in FIG. 3, responsive to the metrics collected in step 310, and the value determined in step 320, a determination is made as to whether a change in the distributed computing environment is advisable. In a preferred embodiment, alternate values are determined based on potential changes to the distributed computing workload (e.g., addition or deletion of particular application jobs at particular locations), configuration modifications (e.g., addition or removal of resources from a grid), and the resultant economic consequences in increased revenue, decreased cost, and potential SLA penalties. If the alternate values indicate a higher value may be obtained, then the decision is made to alter the environment. Note that the change determination process may be provided as a service by a 3rd party or may be operated by the owner of the distributed computing environment.

Two illustrative examples can be understood from the following scenarios: In a first illustrative example, an enterprise maintains a corporate grid, composed of server and storage resources in a region. Utilization is monitored and based on this load, and from the value of the currently running application, it is determined that additional external compute work can be accepted into the corporate grid without affecting the results of the applications being run. In a second illustrative example, the enterprise maintains the same corporate grid. Application A runs on servers 1 and 2. Application B runs on servers 2 and 3. Utilization is monitored. Based on the load, and the value of the currently running applications, Application A is terminated prematurely, Application B is migrated to run on server 3 alone, and servers 1 and 2 are shutdown allowing reduction in electricity and personnel costs at the sites represented by server 1 and server 2. The penalty for premature termination of application A is outweighed in value by the cost savings.

Referring to FIG. 3, if at step 330 it is determined that no modification of the environment is advisable, the method recommences at step 310. If a modification is indicated, in step 340 the change is effected. Changes made in step 340 may include termination or initiation of applications, modifications to service directories accessible from outside the distributed computing environment (e.g., advertising capacity for sale), notification of personnel as to site shutdowns, grid configuration changes, job queue changes, and so on.

Figure 4:
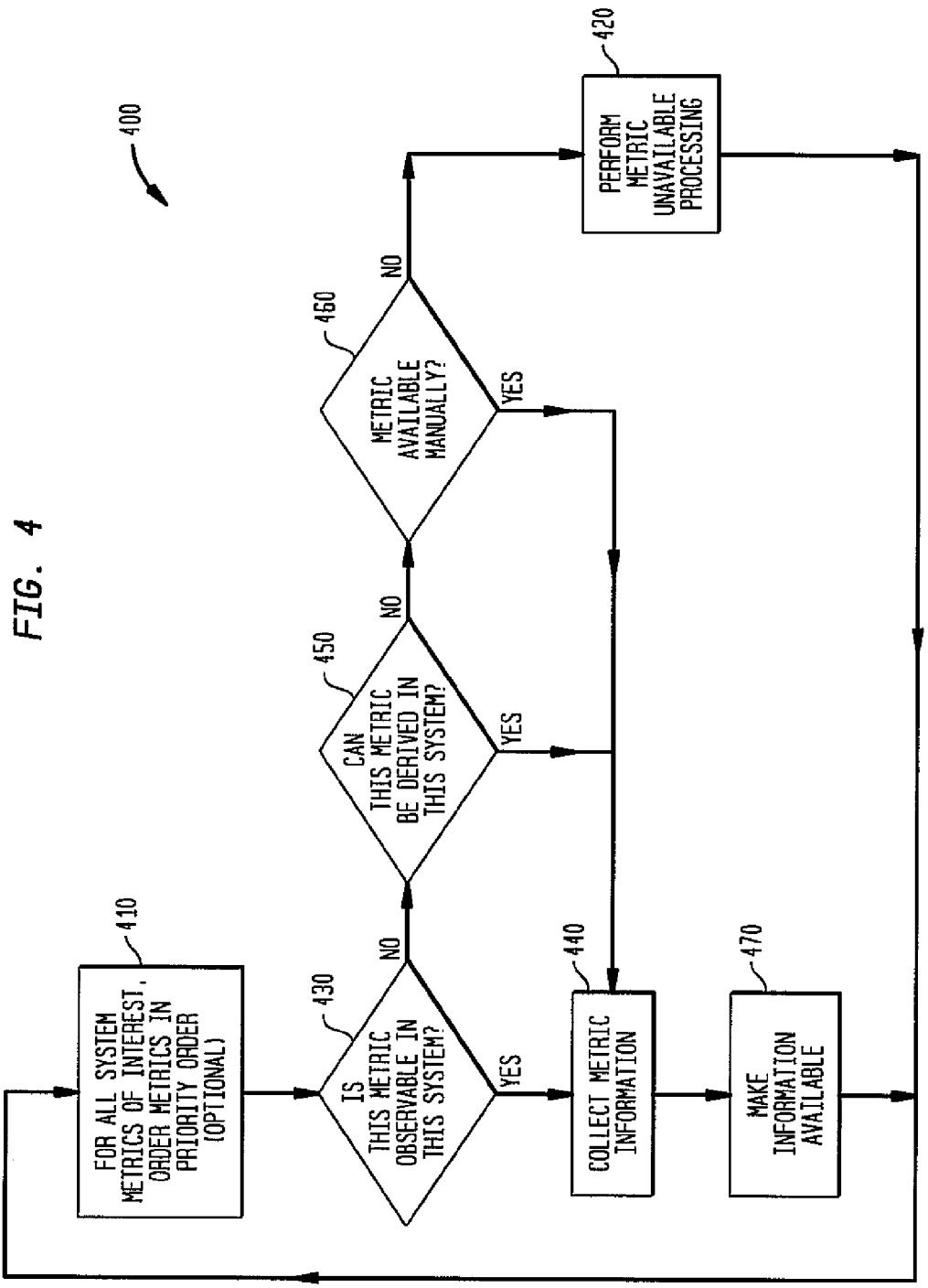
FIG. 4 is a flow chart depicting the process steps implemented for determining a system metric according to the methodology of the present invention.

FIG. 4 is a flow chart depicting the process steps 400 implemented for determining a system metric according to the methodology of the present invention depicted at step 310, FIG. 3. In FIG. 4, at first step 410 includes optionally ordering all the system metrics of interest. The remaining steps 430, 440, 450 and 460 will be executed for each metric of interest ordered at step 410. For each metric of interest, the process proceeds to step 430 where a determination is made as to whether this metric is observable in the distributed computing environment. In one preferred embodiment, the process has available a list of metrics that are obtainable from the system at least some of the time. For example, this may include processor utilization, which is available only when the system is operational and connected to the network; therefore this metric, while available some of the time, may not be available at any given instant. In step 430, thus, it is determined whether the metric is available at this time. If the metric is observable, the process continues to step 440. If the metric is not observable, the process continues to step 450 where a further determination is made as to whether the metric may be derived in the system. The metric may be derivable from historical values, combining other metrics, inferring from other metrics, or inferring from other metrics combined with events. If the result of the evaluation is that the metric may be derived, the process proceeds to step 440. If the result of the evaluation is that the metric cannot be derived, the process proceeds to step 460 where a determination is further made as to whether this metric may be manually obtained. This determination may be table driven, e.g., a table of metrics that may sometimes be manually obtained may be used to make the determination. Some values may be manually obtainable some of the time (e.g., when operation is attended), but not all of the time (e.g., when operation of the system is unattended). If the result of the determination is negative, the process proceeds to step 420 where a notification or logging of the inability to obtain this metric may be performed. Such notification may be normal processing, or may result in an error condition, presumably flagged to the appropriate error recovery process. From 420, the method continues to 410. Returning to step 460, if the result of the evaluation in step 460 was positive, the process proceeds to step 440 where the function of collecting the metric information is performed. This metric collection operation may be performed through observation, polls, estimation, interrogation of operators through a manual process such as request and keyboard entry, etc. This information is collected for all the metrics of interest, as shown by the loop back to step 410 after the information is made available as indicated at step 470. Making available may include, but is not limited to: logging, sending the information to the determining process, transmitting the information across a network, and printing. After step 470, the process returns to step 410, where the steps for determining the metrics are again recommenced.

Figure 5:
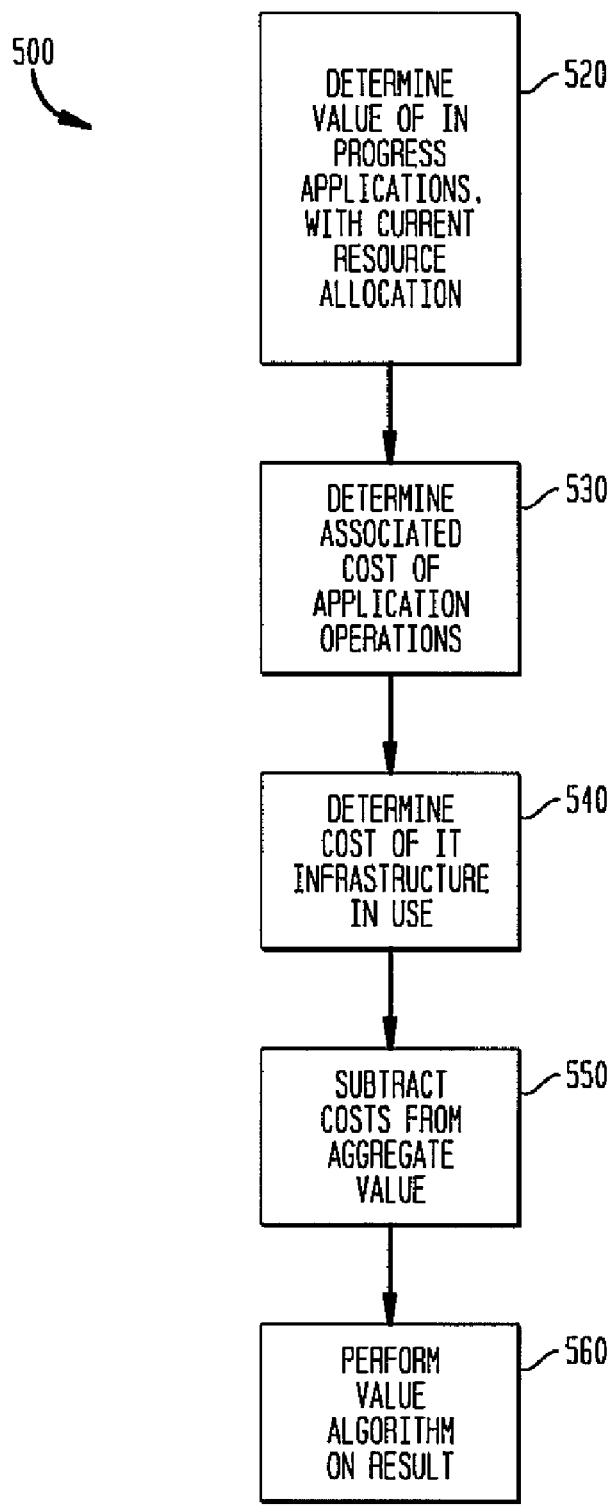
FIG. 5 is a block diagram depicting the components of a model for determining value of a distributed computing environment according to one embodiment of the invention.

FIG. 5 is a flow chart depicting the process 500 for determining value of an in-progress application according to one embodiment of the invention. The process 500 depicted in FIG. 5 begins with step 520 for determining the value of applications in progress, with the current resource allocation. Further detail regarding this step will be described herein with respect to FIG. 6. The process continues with step 530 where the cost associated with the operations of the in-progress applications is determined. These costs may include but are not limited to: network costs (e.g., transmission costs), storage costs, especially if storage is obtained as network attached storage, and licensing costs (e.g., license costs for software may, by contract, be determined by parameters including but not limited to: the number of seats which use the software, the number of systems, or the number of sites). Once the cost associated directly with the operations of the in-progress applications is determined, the process continues to step 540 where the cost of the IT infrastructure in use is determined. The cost of the IT infrastructure includes items that are not application specific but, are specific to systems and sites, including but not limited to power, human operators, and security guards. This cost may include geographically determined values, such as cost of labor and cost of power, and may be time sensitive. Labor costs may be higher on a day not normally worked, for example.

Continuing to step 550, there is depicted the step of determining a value of the environment by calculating the difference between the value of the applications in progress and the costs determined in steps 530 and 540. At the next step 560, there is optionally invoked a process for normalizing the result value calculated at step 550. In a preferred embodiment, this step may include invoking an algorithm for changing all currencies to U.S. dollars, for example, factoring in cost of currency trades, and may include business specific elements such as risk factors for the currency exchange on a date specific to financial cycles (e.g., expected currency value on Monday morning). This step may further include applying a range of valid values and costs to calculations performed in previous steps (such as to an in-progress application value) to provide a range rather than a single value as a final result. The process continues in the manner as will be described herein with respect to FIG. 7.

Figure 6:
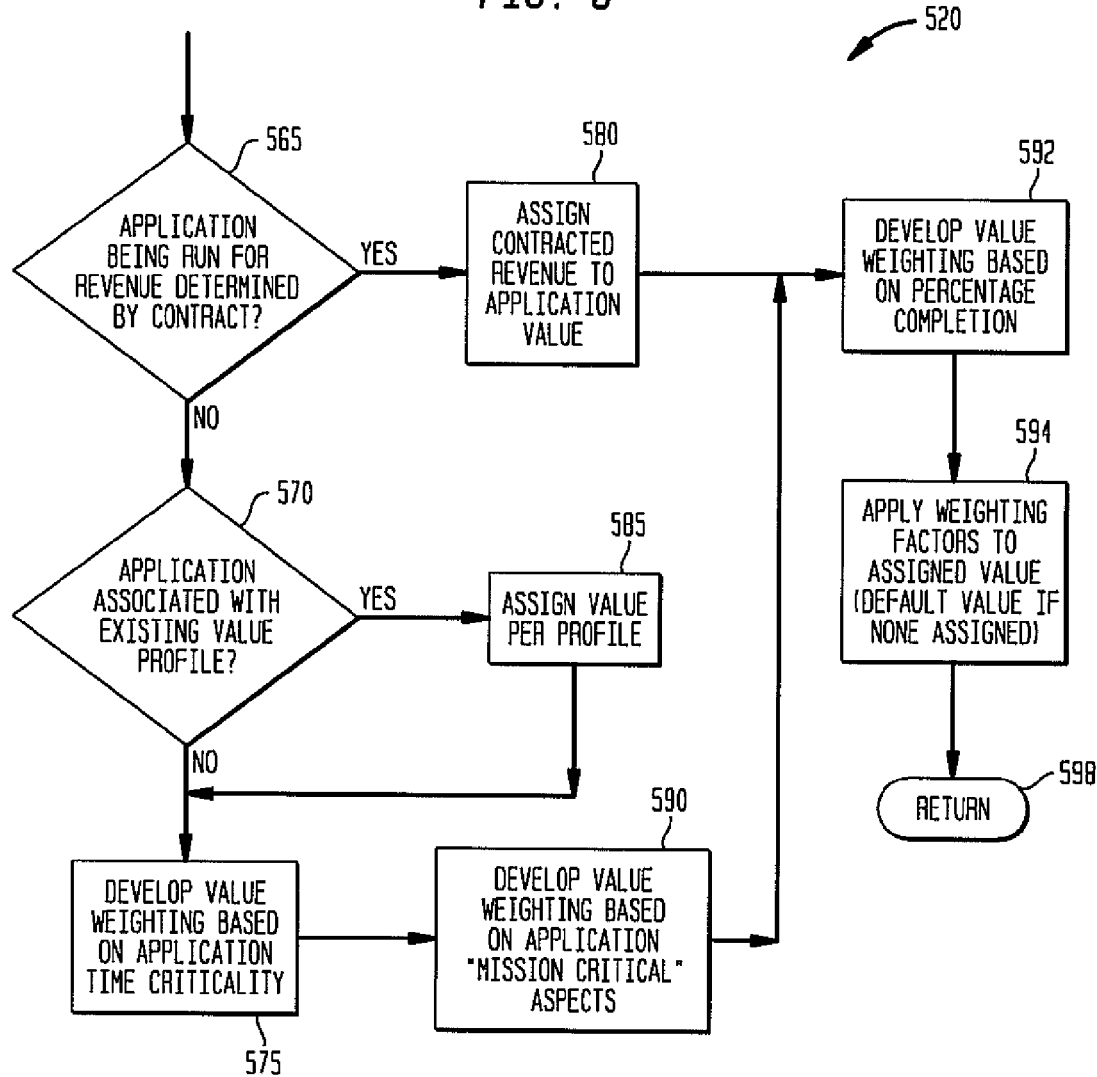
FIG. 6 is a flow chart depicting the steps of determining value of in-progress applications with current resource allocation.

Referring now to FIG. 6, there is depicted a detailed flow chart of the first step 520 of FIG. 5 which is the step of determining value of in-progress applications with current resource allocation. It is understood that the steps depicted in FIG. 6 for determining the value of an application in progress are performed for all applications in progress. At a first step 565, a determination is made as to whether the application under consideration is being executed on behalf of another entity (e.g., another enterprise) for revenue as specified in a contract. This may be performed through examination of an electronic contract, by examining an application profile, by examining invocation parameters for the application, by log entry, or by other means. If the determination is made that the application is being executed on behalf of another entity for revenue as specified in a contract, the process proceeds to step 580 where the contracted revenue for this application run is assigned as the value of the application. Note that the contract may provide incentives or penalties based on performance, time of completion or other factors. These factors may be used to determine the effective contracted value as part of the step of assigning value in block 580. Continuing from step 580, there is next performed the step 592 of developing a value weighting based upon a percentage completion of the in-progress application, as will be explained in greater detail herein.

Returning to step 565, if it is determined that the application under consideration is not being executed on behalf of another entity, the process continues to step 570 where a determination is made as to whether there is a value profile associated with the application. The value profile may include but is not limited to: a numerical value, an algorithm for calculating value, a ranking of value (e.g., High, Medium, Low or a like numerical ranking) and factors such as performance, time of completion, or number of concurrent users. If the application under consideration is determined in step 570 to be associated with a value profile, the process continues to step 585 where the value for this application is assigned based on the value profile. Factors present in the value profile may be used to determine the effective value as part of the step of assigning value in block 585. Continuing from step 585, or if the result of step 570 was negative, the process proceeds to step 575 where there is developed a value weighting based on whether the application is time critical. This determination may be based on an application profile, manual entry, evaluation of output expected, or other means. If no time criticality information is available, this weighting may be a default value, most likely a neutral value. Thereafter, the process proceeds to step 590 where there is developed a value weighting based on whether the application is mission critical. This determination may be based on an application profile, manual entry, evaluation of output expected, interfaces with other mission critical applications, or other means. If no mission critical information is available, this weighting may be a default value, most likely a neutral value. As an example, a mission critical application for a security company may include digital video feeds; for a manufacturing company a mission critical application may include quality assurance on the line. That is, in a manufacturing operation, measurements of quality may be considered a mission critical application. This may include routine tests of manufactured devices, performance analysis of subsystems, and measurements to assure that manufactured parts are within accepted tolerances. Further mission critical examples include: for a telecommunications company, a network problem analysis and for a web retailer, the e-catalogue may be mission critical.

Whether step 580 of assigning the contracted revenue for this application run as the value of the application is performed, or alternately proceeding directly from step 590, there is next performed the step 592 of developing a value weighting based on how far the application execution has progressed. For example, an application that is determined to be 90% complete may be deemed to have more value than one that is 10% complete. This determination may be made based on an application profile, or based on time since process instantiation, or based on output created, manually entered, or by other means. If no information is discernable, then a default weighting may be assigned. Next, continuing to step 594, there is performed the step of assigning a default value if no value had been previously assigned, and applying the weighting factors to the value. Finally in step 598, the process returns to the process step 530 of FIG. 5.

Figure 7:
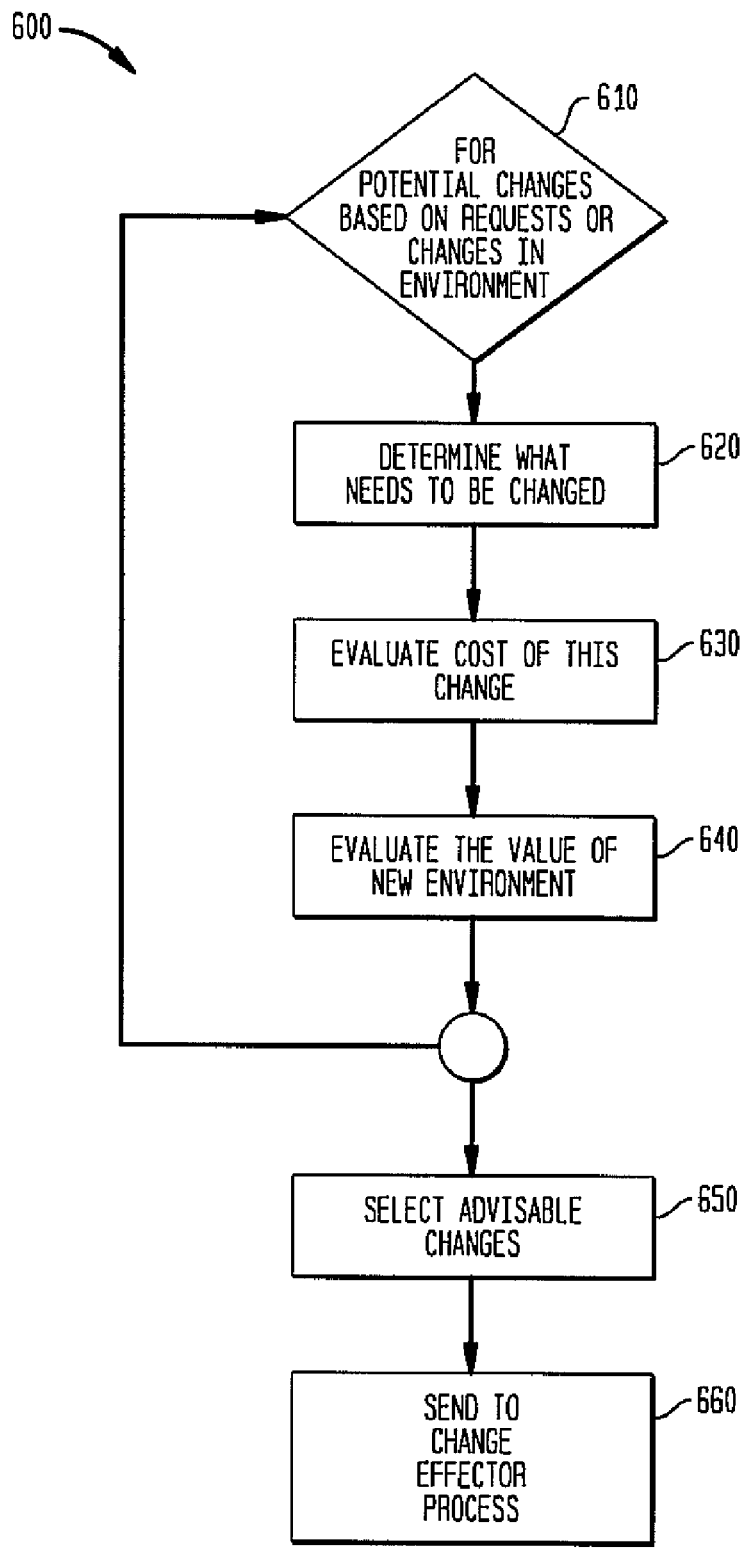
FIG. 7 is a flow chart depicting the steps of determining advisable changes.

Referring now to FIG. 7, there is depicted a detailed flow chart depicting the methodology 600 for determining advisable changes. FIG. 7 begins with a first step 610, which describes a collection of potential changes for which steps 620, 630 and 640 will be executed iteratively, in a "loop" fashion. Step 610 particularly defines the scope of the loop to be potential changes to the environment. These changes may be based on at least one of the following: the environment itself (e.g., applications running); changes in the environment (e.g., completion of applications being run); internal or external requests for resource or work; external factors (e.g., time of day, shift change). These changes may be articulated based on table entries, managed element status, queue status, algorithmically, and so on. In one example of an algorithmically suggested change, application jobs associated with the enterprises for which accounts receivable are the most overdue may be considered for deletion. For example, changes may be based on assets receivables calculations related to the originator (e.g., if a client does not pay, their programs will not be run), changes with liability exposures below a specified amount, liability exposures combined with risk factors, etc. As another example, at any given time, a set of potential changes may be made to cancel each one of the jobs in progress. This example might capture situations where lightly loaded systems, perhaps during off hours, may be shutdown in favor of running their application load during a later time. In a further example, a table of potential changes may be determined from historical data, and reexamined in this step to see if such changes would be advisable at a current time. In yet another example, performance of managed elements (e.g., a database) may indicate congestion, and changes may be evaluated from among those applications which are heavy database users (e.g. give the application deemed most valuable more database priority). For example, if an application is deemed to be causing congestion on a database, it may be advantageous to reduce its priority, and preferentially execute applications with smaller requirements on this resource (e.g., compute heavy not I/O heavy).

For each of the potential changes determined at step 610, FIG. 7, the next process step 620 of the loop is executed to determine what needs to be changed. This may include, but is not limited to: configuration changes, run time environment changes, abnormally ending other applications in order to free resources, releasing or obtaining bandwidth commitments, obtaining or releasing software licenses, etc. In example embodiments, these changes are determined from at least one of: a table, from historical data, from application profiles, or from user input. Continuing at step 630, there is depicted the step of evaluating the cost of this change. Cost of the change may include, but is not limited to: penalties accessed and paid for abnormal termination, penalties accessed and paid for SLA non-compliance, penalties accessed and paid for early release of bandwidth, premiums paid for rapid acquisition of bandwidth, opportunity cost for time spent in releasing a resource (e.g., reconfiguring a storage area network (SAN) may require measurable time where the SAN is not accessible), opportunity cost for time spent in obtaining resource, operator time required for setup, etc.

Thus, at this point, it is understood for each potential change, what has to be done to make the change and what the "setup" cost will be. Note that in a preferred embodiment, this is different than the operational cost of the change. This step covers the costs of making the change (e.g., rapid acquisition of bandwidth); however, it does not cover the cost of further operations (e.g., ongoing cost of bandwidth during the execution of a bandwidth intensive application). Continuing next to step 640, there is depicted the step of evaluating the value of a new environment, assuming that the environment change is made. In a preferred embodiment, step 640 is detailed according to the steps shown in FIG. 5, i.e., determining the value of the environment. That is, the value of potential environments is determined in the same way that the value of existing environments was determined according to FIGS. 5 and 6. Continuing next to step 650, there is depicted the step of selecting the advisable changes. In a preferred embodiment, advisable changes are those which result in a higher value of the new environment as compared to the value of the existing environment. Advisable changes may be selected, for example, by algorithm, by revenue impact, and by consideration of union agreements, however, other methods may be utilized for advising change. In one preferred embodiment, advisable changes are those which do not reduce revenue dollars. It is understood that multiple advisable changes may be selected. Proceeding further to step 660, FIG. 7, an indication of these changes are provided to an effector step, as will be explained in greater detail in accordance with FIG. 8.

Figure 8:
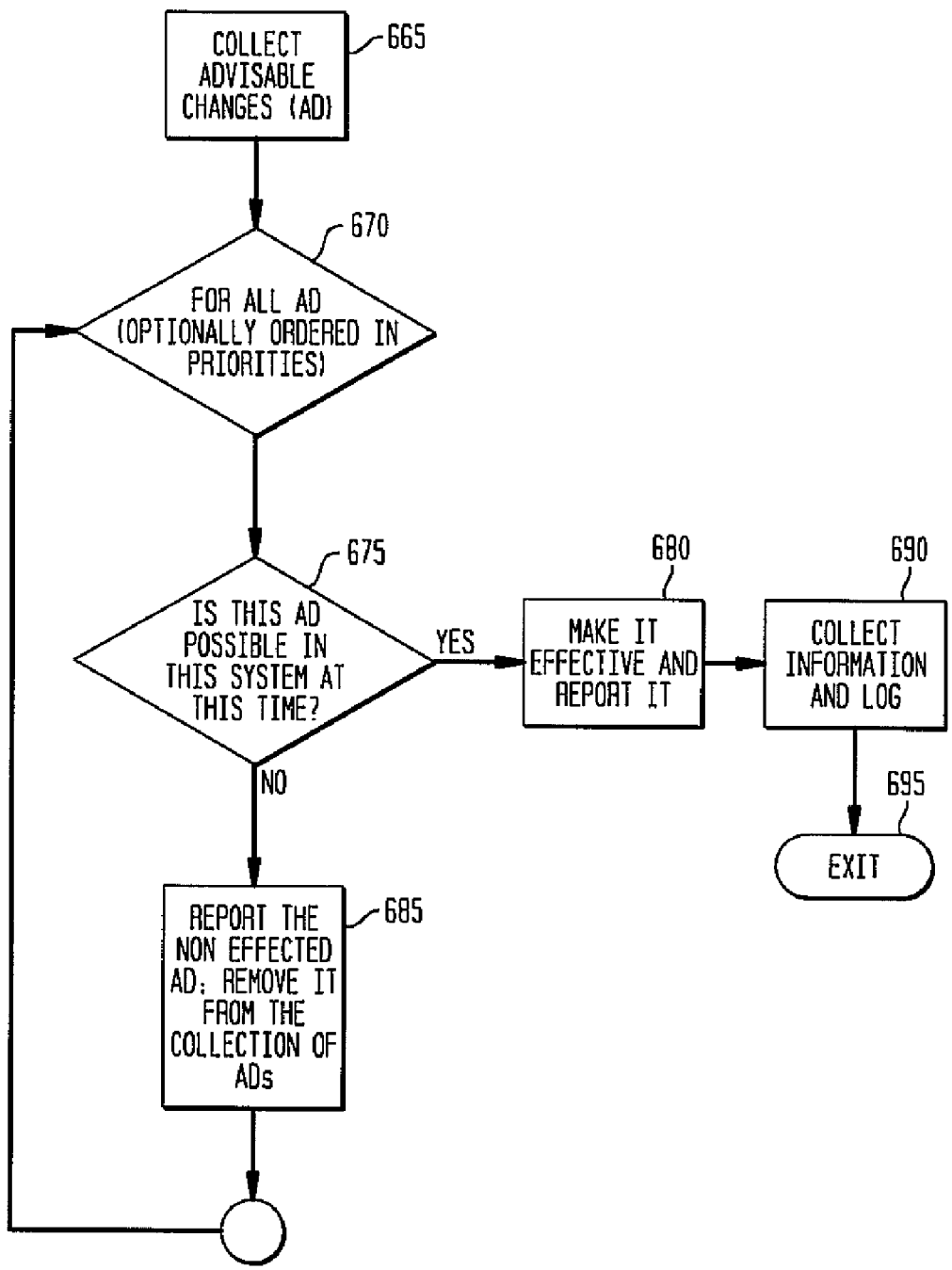
FIG. 8 is a flow chart depicting the steps of effecting advisable changes; and, FIG. 9 is a table depicting example elements of corporate financial data used in evaluating environment value.

FIG. 8 is a flow chart depicting the steps of effecting advisable changes. In FIG. 8, a first process step 665 is depicted which is directed to amassing the advisable changes determined from FIG. 7. In step 670, the scope of a loop comprising steps 675, 680, 685, is described to be all the advisable changes previously determined, which may be optionally ordered by priority. In a preferred embodiment, priority is determined by an environment value, however, priority may further be determined according, but not limited to, the following: by revenue dollars, impact to valued customers, impact to mission critical operations, or combinations of these. Further priority may be determined according, but not limited to, the following: determination via algorithm, by table, by user input, or by historical data. Continuing to step 675, the feasibility of the advised change is evaluated. For example, the steps necessary to effect a change may or may not be possible at the current time due to physical constraints (e.g., operators on board, system outage, communication outage, etc.). In step 675, thus, a decision is made as to whether the change is feasible. If it is determined that the change is not feasible, then the process continues to step 685 which is an optional step of reporting that the change is not feasible. The report may be to a log, to an operator, to a prospective recipient of a benefit of the change (e.g., an enterprise which requested an application be executed). After reporting, this change is removed from the collection of advisable changes. If at step 675 it is determined that the change is feasible, the process continues to step 680 where the necessary actions to make the change effective are initiated, and optionally report that this has been done. The report may be to a log, to an operator, to a recipient of a benefit of the change, to a stakeholder associated with the change (e.g., owner of an application which is being terminated abnormally). Proceeding next to step 690, there is depicted the step of collecting information about the change deployment and logging it. At step 695, the process is exited, and returns to the method step 310 of FIG. 3.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for managing electric power consumption by elements of a distributed computing system, said elements including computer devices forming an environment for processing one or more executable applications, said method comprising:

determining, while in-progress applications are being run in said computing system, one or more system metrics that relate to electric power usage as currently consumed by currently configured elements of said distributed computing system;

receiving current data from resources local to and external to the distributed computing system, said data including external factors affecting electric power consumption of said currently configured elements;

determining a system value in response to said one or more system metrics based on said current data from said local and external resources, said value determined according to one or more value criteria, and said value translatable to a financial value; and while said in-progress applications are being run in said distributed computing system, evaluating one or more potential changes operative to alter electric power consumption in the distributed computing system responsive to said current data aggregated from said local and external resources and determining associated alternate system values based on said changes, said alternate system value reflecting a consequence translatable to decreased cost resulting from a potential change; and, re-configuring elements of said distributed computing system according to said one or more potential changes operative to alter electric power consumption dynamically while said distributed computing system is operating, in accordance with a determined alternate system value.

2. The method for managing electric power consumption as claimed in claim 1, wherein said one or more potential changes operative to alter electric power consumption in the distributed computing system includes one or a combination of: terminating in-progress applications executing on said elements, rescheduling an application, adding new applications or migrating existing in-progress applications to other elements, starting up one or more elements or powering down one or more elements.

3. The method for managing electric power consumption as claimed in claim 1, wherein said dynamic re-configuring includes one or more of: terminating or initiating of applications; powering down or modifying power consumption of a distributed computer system; configuration changes; job queue changes; and, migrating executing applications or redistributing computing workload currently executing in said distributed computing system to other devices at a same or different location.

4. The method for managing electric power consumption as claimed in claim 1, further comprising: maintaining data for determining a system value in response to said one or more system metrics that relate to power usage.

5. The method for managing electric power consumption as claimed in claim 4, wherein a value criteria comprises one or more data relating to the cost associated with power usage at a specific geographic location.

6. The method for managing electric power consumption as claimed in claim 5, wherein said maintained data includes financial data associated with a location of a distributed computing system resource, said financial data including data specifying power usage rates at different times of day.

7. The method for managing electric power consumption as claimed in claim 1, wherein a system metric represents information including one or more metrics selected from the group of: attributes of configuration, computing and data storage resources, performance, power utilization, hardware and software activity profiles and utilization.

8. A system for managing electric power consumption by configuring elements of a distributed computing system, said elements including computer devices forming an environment for processing one or more executable applications, said system comprising:

a memory;

a processor unit in communications with the memory, wherein the processor unit is configured to perform a method comprising:

determining, while in-progress applications are being run in said distributed computing system, one or more system metrics that relate to electric power usage as currently consumed by currently configured elements of said distributed computing system;

receiving current data from resources local to and external to the distributed computing system, said data including external factors impacting electric power consumption of said currently configured elements;

determining a system value in response to said one or more system metrics based on said current data from said local and external resources, said value determined according to one or more value criteria, and said value translatable to a financial value; and;

while said in-progress applications are being run in said distributed computing system, evaluating one or more potential changes operative to alter electric power consumption in the distributed computing system responsive to said current data aggregated from said local and external resources, and determining associated alternate system values based on said changes, said alternate system value reflecting a consequence translatable to decreased cost resulting from a potential change; and, re-configuring elements of said distributed computing system according to said one or more potential changes operative to alter electric power consumption dynamically while said distributed computing system is operating, in accordance with a determined alternate system value.

9. The system for managing electric power consumption as claimed in claim 8, wherein said one or more potential changes includes one or a combination of: terminating in-progress applications executing on said elements, rescheduling an application, adding new applications or migrating existing in-progress applications to other elements, starting up one or more elements or powering down one or more elements.

10. The system for managing electric power consumption as claimed in claim 8, wherein said memory includes a data storage device for maintaining data for determining a system value in response to said one or more system metrics that relate to electric power usage, wherein said maintained data includes financial data associated with a location of a distributed computing system resource, said financial data including data specifying power usage rates at different times of day.

11. The system for managing electric power consumption as claimed in claim 8, wherein a value criteria comprises one or more data relating to the cost associated with power usage at a specific geographic location.

12. The system for managing electric power consumption as claimed in claim 8, wherein the dynamic re-configuring includes one or more of: terminating or initiating of applications; powering down or modifying power consumption of a computer system; configuration changes; job queue changes; and, migrating executing applications or redistributing computing workload currently executing in said distributed computing system to other devices at a same or different location.

13. The system for managing electric power consumption as claimed in claim 7, wherein a system metric represents information including one or more metrics selectively comprising: attributes of configuration, computing and data storage resources, performance, power utilization, hardware and software activity profiles and utilization.

* * * * *